United States Patent [19]
Kuribayashi

[11] Patent Number: 5,606,991
[45] Date of Patent: Mar. 4, 1997

[54] PRESSURE CONTROL VALVE

[75] Inventor: Seiji Kuribayashi, Sashima-gun, Japan

[73] Assignee: Kyosan Denki Co., Ltd., Tokyo, Japan

[21] Appl. No.: 365,303

[22] Filed: Dec. 28, 1994

[30] Foreign Application Priority Data

Dec. 29, 1993 [JP] Japan .................... 5-353313

[51] Int. Cl.⁶ .................................................. F16K 31/12
[52] U.S. Cl. .................... 137/510; 123/463; 251/337
[58] Field of Search ........................... 137/510; 123/456, 123/463, 467; 251/337

[56] References Cited

U.S. PATENT DOCUMENTS

| | | | |
|---|---|---|---|
| 2,528,440 | 10/1950 | Kmiecik | 137/510 |
| 3,106,219 | 10/1963 | Teston | 137/510 |
| 4,596,219 | 6/1986 | Kemmner | 123/467 |
| 4,635,537 | 1/1987 | Field | 137/510 X |
| 4,741,360 | 5/1988 | Affeldt et al. | 137/510 |
| 4,742,845 | 5/1988 | Capoccia et al. | 137/510 |
| 5,104,091 | 4/1992 | Rathay et al. | 251/337 X |

Primary Examiner—Denise L. Ferensic
Assistant Examiner—Joanne Y. Kim
Attorney, Agent, or Firm—Flynn, Thiel, Boutell & Tanis, P.C.

[57] ABSTRACT

A pressure control valve is made small-sized and light-weighted and assembly of parts thereof can be simplified. Diameter of an upper end of a control spring is smaller than that of a lower end thereof while a ball o which a valve body is fixed is held by a claw member. An engaging member is provided in a lower casing and is spaced from a side wall of the lower casing. A seat portion for receiving the control spring is integrally formed on a holding member and thickness of a caulked portion of an upper casing is greater than that of the other part of the upper casing.

19 Claims, 6 Drawing Sheets

PRESSURE CONTROL VALVE

BACKGROUND OF THE INVENTION

1. Field of the Invention

The present invention relates to a pressure control valve applied to a fuel injection equipment of an internal combustion engine, more particularly to a structure for making the pressure control valve small-sized.

2. Prior Art

In a fuel injection equipment of an internal combustion engine of an automobile, there is provided a pressure control valve for controlling pressure of fuel which is injected to an intake pipe. The pressure control valve is a pressure relief valve for discharging fuel based on the balance between intake negative pressure, a control spring and fuel pressure in order to obtain fuel pressure corresponding to the intake negative pressure.

An example of a prior art pressure control valve will be now described with reference to FIG. 9 which is a cross-sectional view thereof.

The pressure control valve includes a fuel inlet passage 2, a fuel outlet passage 3 and an introduction passage 4 for intake negative pressure. A valve body 1 comprises an upper casing 1A and a lower casing 1B wherein a diaphragm 5 is held and clamped between the upper casing 1A and lower casing 1B. An end of the fuel outlet passage 3 forms a valve seat 6 which is opened or closed by a flat-plate shaped valve body 7. The diaphragm 5 is penetrated to provide a holding member 8. A hole 10 is provided at the center of the holding member 8 for receiving a ball 9 to which the valve body 7 is fixed. The ball 9 is prevented from slipping off by a retaining member 11 and it is universally rotatable. A presser spring 12 is provided between the ball 9 and the bottom of the hole 10 for preventing the inclination of the valve body 7 by pressing the valve body 7 toward the valve seat 6. A conical member 13 is provided on the holding member 8 for clamping the diaphragm 5. A control spring 14 is provided inside an upper casing 1A on the conical member 13 for pressing the diaphragm 5 downward (in the direction to close the valve seat 6 by the valve body 7). The diaphragm 5 is held by the valve body 1 by putting a deformation prevention member 15 and once caulking the deformation prevention member 15 by the upper end of the lower casing 1B, then putting the lower end of the upper casing 1A on the caulked upper end of the lower casing 1B and caulking the upper end of the lower casing 1B by the lower end of the upper casing 1A. The intake negative pressure is introduced from an internal combustion engine (not shown) into a negative pressure chamber 16 in a space above the diaphragm 5 through the introduction passage 4. A seal 17 is provided between the caulked portion between the upper casing 1A and lower casing 1B for assuring the sealing of the negative pressure chamber 16.

The prior art pressure control valve operates as follows.

The fuel flows from the fuel inlet passage 2 and always acts upon the diaphragm 5 and holding member 8. When the valve body 7 opens the valve seat 6 due to the functional relation between the fuel pressure and intake negative pressure acting upon the control spring 14 and the upper side of the diaphragm 5, the fuel reaches the fuel outlet passage 3 and flows out from the fuel outlet passage 3. Since the holding member 8 which is vertically movably held by the diaphragm 5 is not always centered, the valve body 7 can surely close the valve seat 6 when the ball 9 is universally rotated.

In the prior art pressure control valve, when the load to be applied to the diaphragm 5 by the control spring 14 (hereinafter referred to as a setting load) is set after assembling automobile parts, the setting value is adjusted by plastically deforming the surface of the upper casing 1A by an external force FA, for example, by plastically deforming the surface of the upper casing 1A from the state as illustrated by broken lines to the state as illustrated by solid lines.

The intake negative pressure acts upon the upper surface of the diaphragm 5 comprising two adhered members and fuel pressure acts upon the lower surface of the diaphragm 5. Accordingly, force FB to open the caulked portion acts upon the caulked portion of the diaphragm 5, whereby the diaphragm 5 is liable to be slipped off. However, since the deformation prevention member 15 is provided, the caulked portion of the diaphragm 5 is prevented from being opened and slipped off by rigidity of the deformation prevention member 15.

Further, if the diaphragm 5 is made of rubber alone, the diaphragm 5 is deteriorated because rubber is swelled by the fuel. Accordingly, there is proposed a diaphragm having a double structure, i.e. made of rubber which is backed by an oil resistant synthetic resin film.

Automobiles are now required to be small-sized and light-weighted. To meet these requirements, each part constituting the automobile parts (hereinafter referred to as simply parts) is necessary to be small-sized and the number of parts must be reduced. If the parts are small-sized, the assembly of the parts becomes difficult and complicated. Accordingly, the parts must be structured so as to be small-sized and easily assembled.

However, according to the structure of the prior art pressure control valve, there are the following problems for making it small-sized and light-weighted.

When the pressure control valve is made small-sized in the direction of its diameter in FIG. 10, an interval L between the control spring 14 and one side of the upper casing 1A is reduced. If the interval L is reduced, it is impossible to assure the length H which is necessary for sufficient deformation of the upper casing 1A even if the setting load of the control spring 14 is adjusted by plastically deforming the top surface of the upper casing 1A by the external force FA. Accordingly, it is substantially impossible to adjust the setting load.

Further, when the diameter of the pressure control valve is reduced, the diameter of the upper casing 1A is also reduced so that it takes large load to deform cornered portion of the upper casing 1A.

Accordingly, with the structure of the prior art pressure control valve, the fact that the sufficient length H for deforming is not assured and the load necessary for deformation is increased become obstacles to make the pressure control valve small-sized.

According to the structure of the holding member 8 and valve body 7 of the prior art pressure control valve, since the holding member 8 swings in the direction of arrow S in FIG. 9, it is difficult to attach the diaphragm 5. This difficulty is increased when the pressure control valve is made more small-sized. Since the swing of the holding member 8 in the direction of arrow S occurs during the operation of the pressure control valve, the valve body 7 insufficiently closes the valve seat 6, which causes partial abrasion of the valve body 7 or valve seat 6.

Further, according to the arrangement of the holding member 8 and valve body 7 of the pressure control valve, since the conical member 13 and presser spring 12 are provided, the number of parts is reduced, which increases the difficulty of assembly of the parts and obstructs to make the pressure control valve small-sized.

Still further, according to the arrangement of the prior art pressure control valve, since the caulked portion between of the diaphragm 5 is prevented from being opened by the upward force FB which acts upon the diaphragm 5, the deformation prevention member 15 is provided. This requires the seal 17, which increases the number of parts. Accordingly, when the pressure control valve is made small-sized, the assembly of the parts is made difficult and costs high, which obstructs making the pressure control valve small-sized.

With the arrangement of the proposed pressure control valve, since the diaphragm 5 is made of rubber which is backed by an oil resistant synthetic resin film, there is a likelihood of generation of curling, i.e., bending of the diaphragm 5 due to the difference of contraction rate of rubber and synthetic resin film. The curling is generated in such a flat diaphragm pressure control valve and particularly, it becomes large at the outer periphery of the diaphragm. If such curling is generated, it is substantially impossible to caulk the diaphragm 5 of the small-sized pressure control valve.

SUMMARY OF THE INVENTION

It is therefore an object of the present invention to improve the drawback of the prior art pressure control valve and to provide a pressure control valve capable of reducing and easily assembling the number of parts thereof, thereby improving the reliability thereof and making the pressure control valve small-sized.

To achieve the above object, the pressure control valve according to a first aspect of the present invention comprises a valve body comprising an upper casing and a lower casing, a fuel inlet passage, a fuel outlet passage and an intake negative pressure introduction passage respectively provided in the valve body, a diaphragm clamped and held between the upper and lower casings, a holding member provided on the diaphragm, a valve body fixed to a ball which is held by the holding member, a valve seat which is provided at an end of the fuel outlet passage and is closable by the valve body, and a control spring which is inside the upper casing on a holding member for pressing the holding member in the direction to close the valve seat by the valve body, characterized in that the control spring comprises two-stage spring composed of an upper control spring and a lower control spring, wherein diameter of an upper end of the upper control spring is reduced.

The pressure control valve according to a second aspect of the invention is characterized in that the control spring comprises integrated upper and lower springs, wherein the upper spring is a conical spring which is gradually reduced in its diameter toward the upper portion thereof.

The pressure control valve according to a modification of second aspect of the invention is characterized in that pitches of the upper control spring are zero and it is substantially formed of a rigid material.

The pressure control valve according to a third aspect of the invention is characterized in that the upper control spring is a conical spring which is gradually reduced in its diameter toward the upper portion thereof.

The pressure control valve according to a fourth aspect of the invention is featured in that the holding member further comprises a contact portion to which the ball contacts and a claw member formed of an elastically deformable member, wherein the ball is held by the claw member and is brought into contact with the contact portion by elasticity of the claw member.

The pressure control valve according to a fifth aspect of the invention is characterized in that the holding member further comprises an engaging member which is spaced from a side wall of the lower casing for preventing the holding member from being swung.

The pressure control valve according to a sixth aspect of the invention is characterized in that the holding member comprises an integrated member penetrating the diaphragm, wherein the holding member includes a seat member for receiving the control spring above the diaphragm, and wherein the holding member includes a contact portion to which the ball contacts, a claw member formed of an elastically deformable member, and an engaging member which is spaced from a side wall of the lower casing.

The pressure control valve according to a seventh aspect of the invention is characterized in that the diaphragm comprises a first diaphragm film body made of rubber and a second diaphragm film body made of oil resistant synthetic resin wherein the first and second diaphragm film bodies are independent of each other and double structured.

The pressure control valve according to an eighth aspect of the invention is characterized in that the valve body, diaphragm and lower casing are caulked with one another wherein thickness of a caulked portion of the upper casing is greater than that of the upper portion of the upper casing.

PREFERRED EMBODIMENT OF THE INVENTION

A pressure control valve according to a preferred embodiment of the present invention will be now described with reference to FIGS. 1 to 6.

Figure 1:
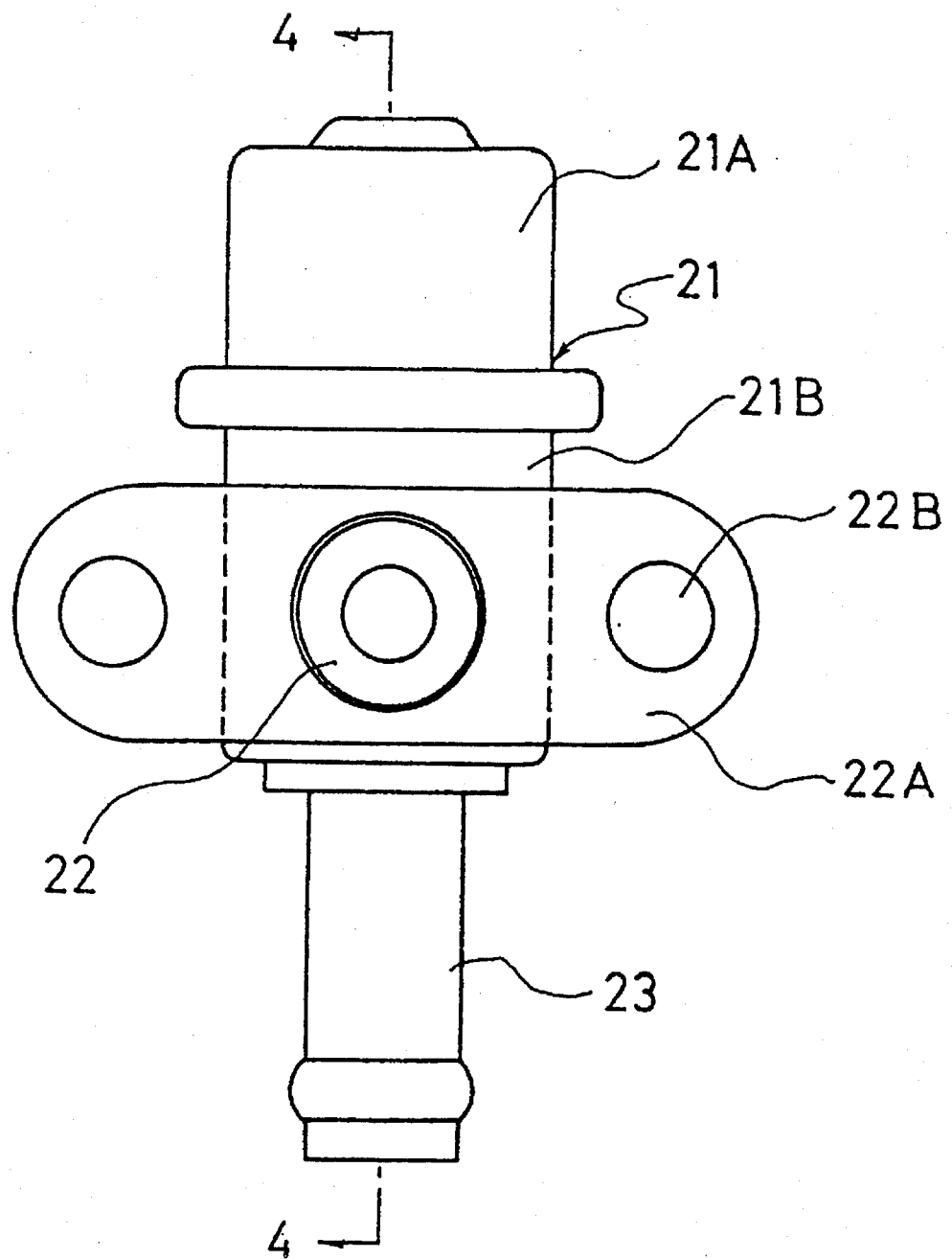
FIG. 1 is a front view of a pressure control valve according to a first embodiment of the present invention.
Figure 2:
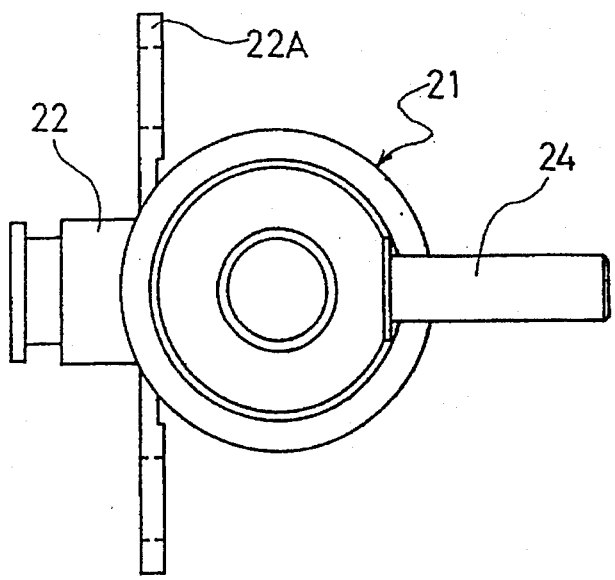
FIG. 2 is a plan view of the pressure control valve of FIG. 1.
Figure 3:
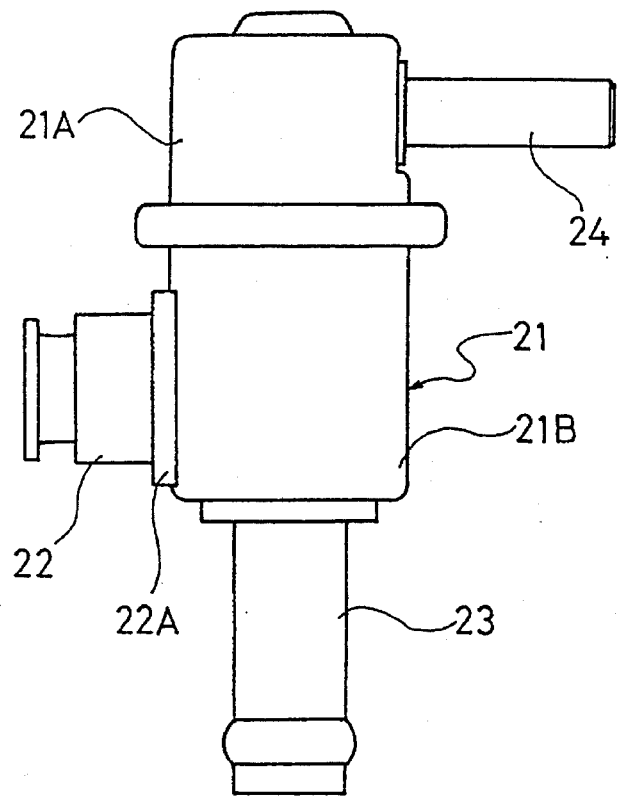
FIG. 3 is a side view of the pressure control valve of FIG. 1.
Figure 4:
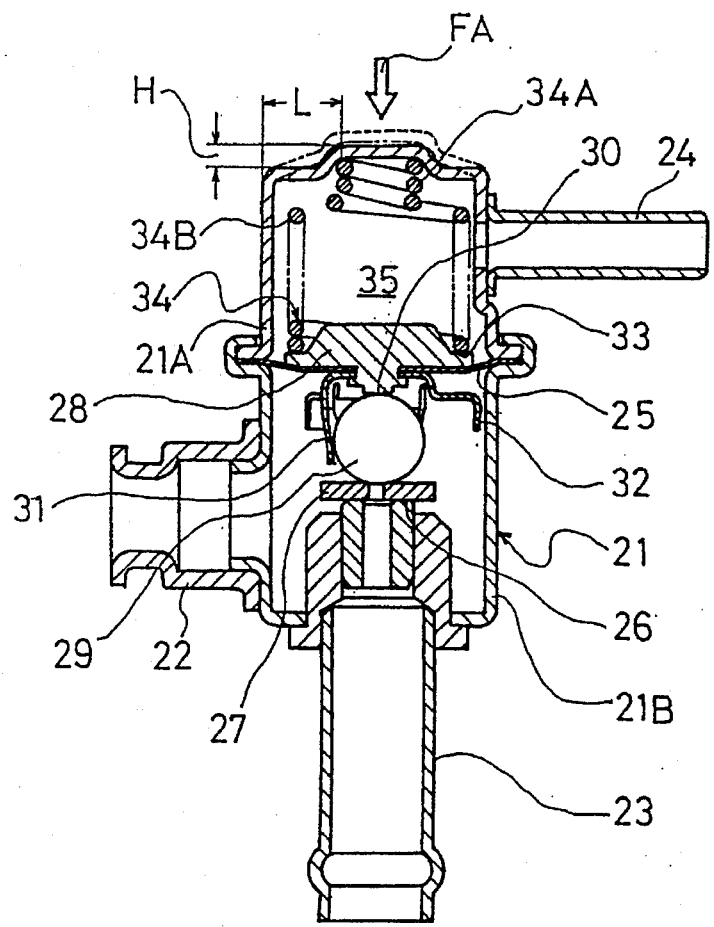
FIG. 4 is a cross-sectional view of the pressure control valve of FIG. 1 taken along line 4—4 in FIG. 1.

FIG. 1 is a front view of a pressure control valve according to a first embodiment of the present invention, FIG. 2 is a plan view of the pressure control valve of FIG. 1, FIG. 3 is a side view of the pressure control valve of FIG. 1, and FIG. 4 is a cross-sectional view of the pressure control valve of FIG. 1 taken along line 4—4 of FIG. 1.

A fuel inflow passage 22, a fuel outflow passage 23, and an intake negative pressure introduction passage 24 are respectively provided in a valve shell 21. The fuel inflow passage 22 has a flange portion 22A which is integrated therewith and extends laterally. The fuel inflow passage 22 is fixed to the valve body 21 by way of the flange portion 22A by screwing screws (not shown) through screw holes 22B defined on the flange portion 22A. The valve body 21 comprises an upper casing 21A and a lower casing 21B. A diaphragm 25 is clamped and held by the upper casing 21A and lower casing 21B. An end of the fuel outflow passage 23 forms a valve seat 26 which is opened or closed by a flat-plate shaped valve body 27. The diaphragm 25 is penetrated to provide a holding member 28. The holding member 28 has a contact portion 30 at the center thereof wherein a ball 29 to which the valve shell 27 is fixed is brought into contact with the contact portion 30. The ball 29 is prevented from being slipped off by claw members 31 and it is urged in the direction to be pressed toward the contact portion 30 by elasticity of the claw members 31. Claw members 31 universally rotatably hold the ball 29. Engaging members 32 provided inside the lower casing 21B and slightly spaced from the side wall of the lower casing 21B prevent the holding member 28 from being swung to the left and right. A seat portion 33 is provided on the holding member 28 and a control spring 34 is provided inside the upper casing 21A on the seat portion 33 for pressing the diaphragm 25 downward (in the direction to close the valve seat 26 by the valve body 27). Intake negative pressure generated in an internal combustion engine (not shown) is introduced into a negative chamber 35 which is a space positioned above the diaphragm 25 through the intake negative pressure introduction passage 24.

An arrangement of the control spring 34 will be now described more in detail.

The control spring 34 comprises an upper control spring 34A and a lower control spring 34B. Since the diameter of the upper control spring 34A is smaller than that of the lower control spring 34B and pitches of the upper control spring are zero, the upper control spring 34A is large in its elastic coefficient, thereby making the upper control spring 34A substantially rigid while the diameter of the lower control spring 34B is larger than that of the upper control spring 34A and determines the setting load.

According to the present invention, when adjusting setting load of the control spring 34, an external force FA acts upon to plastically deform the upper surface of the upper casing 21A (e.g., from the state as illustrated by broken lines to the state as illustrated by solid lines in FIG. 4).

With the arrangement of the control spring 34, since the interval L from the side surface of the upper casing 21A to the side surface of the upper control spring 34A is sufficiently large, the deforming length H of the upper surface of the upper casing 21A can be made long, thereby adjusting the setting load easily with assurance.

The arrangement of the holding member 28 and valve body 27 will be now described more in detail.

Figure 5:
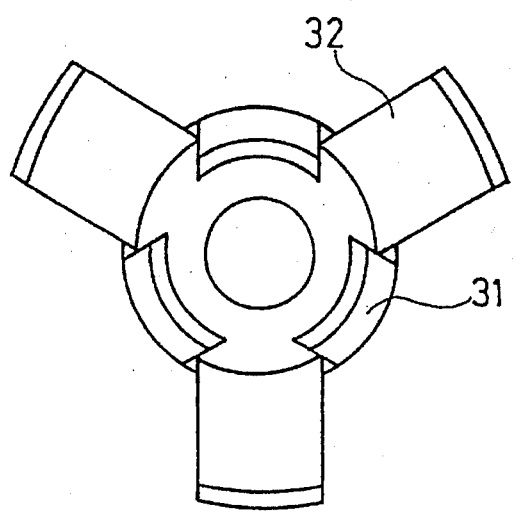
FIG. 5 is a plan view showing a claw member and an engaging member of the pressure control valve of FIG. 1.

The holding member 28 is integrally formed and the seat portion 33 of the control spring 34 is integrally formed with the holding member 28 above the diaphragm 25 and the contact portion 30 contacting the ball 29 is integrally formed with the holding member 28 at the center thereof under the diaphragm 25. Claw members 31 and engaging members 32 are structured by cutting a plate into a petal-shaped one and then bending each petal alternately as shown in FIG. 5 wherein each petal bent at its root forms the claw member 31 while each petal bent at its end forms the engaging member 32.

Since the claw members 31 wrap the ball 29 so as to hold the ball 29, the ball 29 is prevented from slipping off. Since the claw members 31 are formed by bending each petal and each petal is swollen outward while holding the ball 29, the ball 29 is urged in the direction to be pressed by the contact portion 30 due to elasticity of the contact portion 30. Accordingly, the ball 29 and valve shell 27 are always pressed to their central positions so that the valve seat 26 is not completely closed by the valve body 27, which prevents the partial abrasion of the valve body 27 and valve seat 26.

Since the ball 29 is freely rotatable in the claw members 31, the ball 29 is universally rotatably supported by the claw members 31 so that the valve body 27 closes the valve seat 26 with assurance.

Still further, since the holding members 28 are prevented from being swung in the left and right by the engaging member 32, it is possible to caulk the periphery of the diaphragm 25 with assurance when assembling the parts, which improves the reliability of the pressure control valve.

Figure 6:
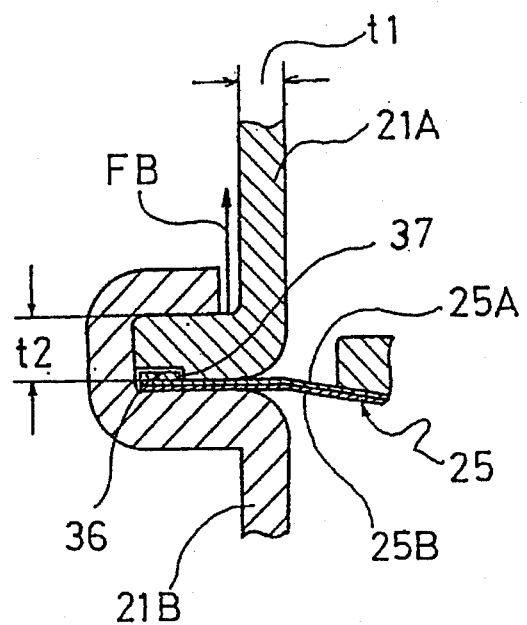
FIG. 6 is a cross-sectional view showing caulked portions of an upper casing and a lower casing of the pressure control valve of FIG. 1.

In FIG. 6, the thickness t2 of the upper casing 21A at the portion near the caulked portion of the diaphragm 25 (adjacent to the bent portion) is greater than the thickness t1 of the upper portion of the upper casing 21A. Accordingly, even if the force FB, corresponding to the fuel pressure acting upon the diaphragm, acts upon the diaphragm 25, there is little likelihood that the caulked portion is open so that the diaphragm 25 is prevented from being slipped off from the valve body 21. Particularly, when the pressure control valve is made small-sized, caulking area is reduced so that the diaphragm 25 is liable to be slipped off even if there is any small opening in the caulked portion. However, it is possible to make the pressure control valve small-sized since there is no opening in the caulked portion.

Still further, as the thickness t2 of the upper casing 21A at the portion near the caulked portion of the diaphragm 25 is increased, the thickness of the upper casing 21A at the end thereof is also increased so that a stepped portion 37 is easily formed on the end of the upper casing 21A. Accordingly, when a relatively thick ring section 36 formed around the outer peripheral edge of the diaphragm 25 is held by the stepped portion 35', the diaphragm 25 is prevented from being slipped off with more assurance.

An arrangement of the diaphragm 25 according to the present invention will be now described more in detail with reference to FIG. 6.

The diaphragm 25 is double-structured, namely, formed of a diaphragm film body 25A made of rubber and a diaphragm film body 25B made of oil resistant synthetic resin such as TEFLON (trade mark). The diaphragm film body 25B made of oil resistant synthetic resin is disposed at the side contacting the fuel. Accordingly, rubber forming the diaphragm film body 25A, i.e., the diaphragm 25 is neither lowered in its strength nor deteriorated in its material.

Further, the diaphragm film body 25A and diaphragm film body 25B merely overlap each other without being adhered with or baked on each other. Accordingly, the diaphragm 25 does not generate curling, which improves the reliability of the pressure control valve. Further, since no adhesive agent is used, the diaphragm 25 is not inferiorly influenced by the adhesive agent.

Since opening and closing operation of the valve body of the pressure control valve relative to the valve seat are the same of those of the prior art pressure control valve, the explanation thereof is omitted.

The arrangement of the pressure control valve of the present invention is the preferred embodiment, i.e., one of examples but not limited to such preferred embodiment. There are, for example, the following modifications.

Figure 7:
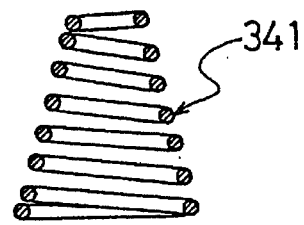
FIG. 7 is a cross-sectional view of a control spring according to a modification of a pressure control valve.

First Modification (FIG. 7)

A control spring 341 is an integral conical spring diameter of which is gradually reduced toward the upper portion thereof. Since the diameter of the control spring 341 is small at the upper end thereof, the upper casing can be easily plastically deformed in case of adjusting the setting load.

Figure 8:
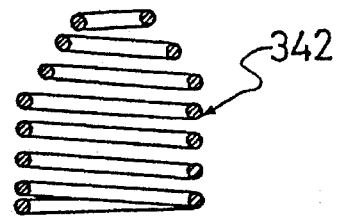
FIG. 8 is a cross-sectional view of a control spring according to another modification of a pressure control valve.
Figure 9:
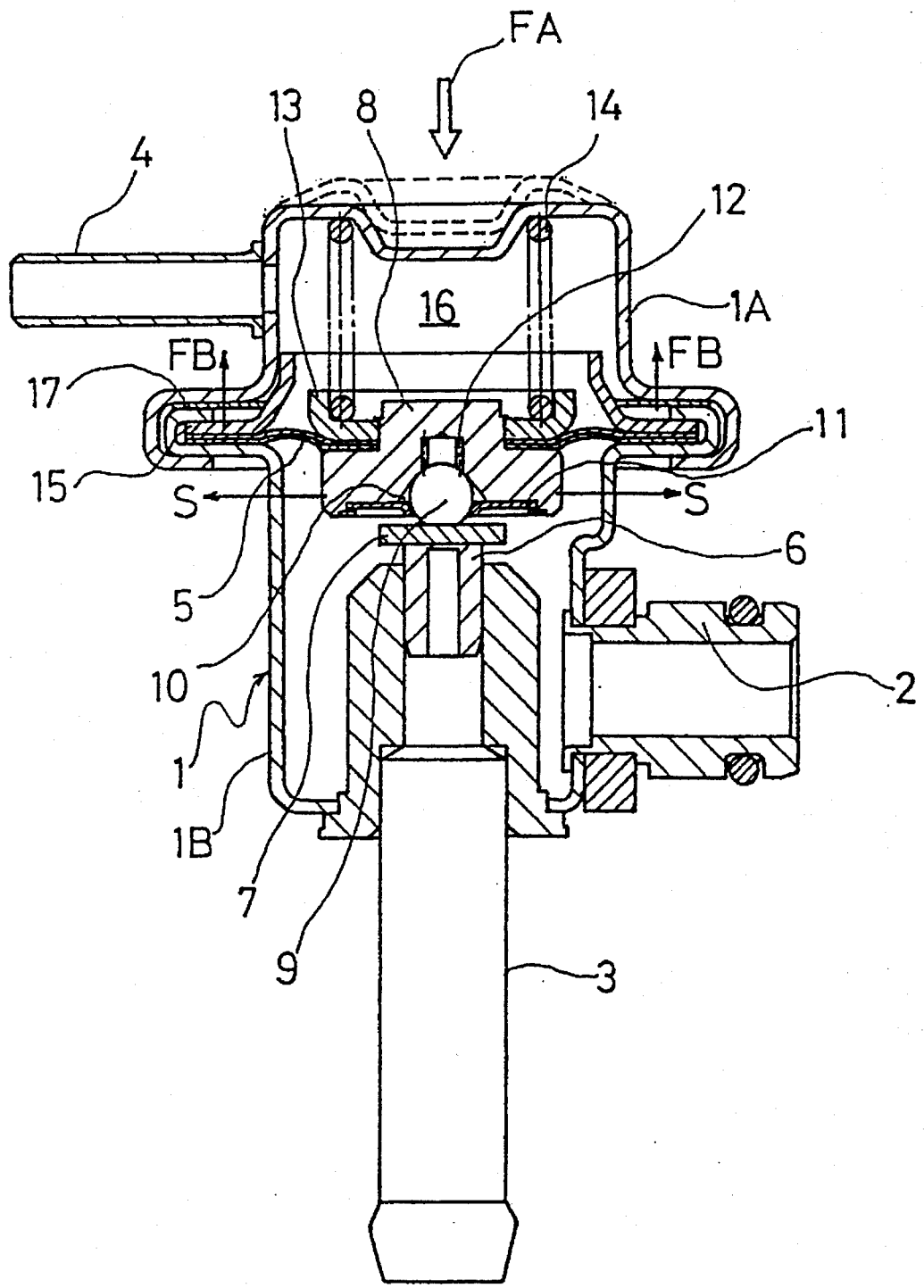
FIG. 9 is a cross-sectional view of a prior art pressure control valve.
Figure 10:
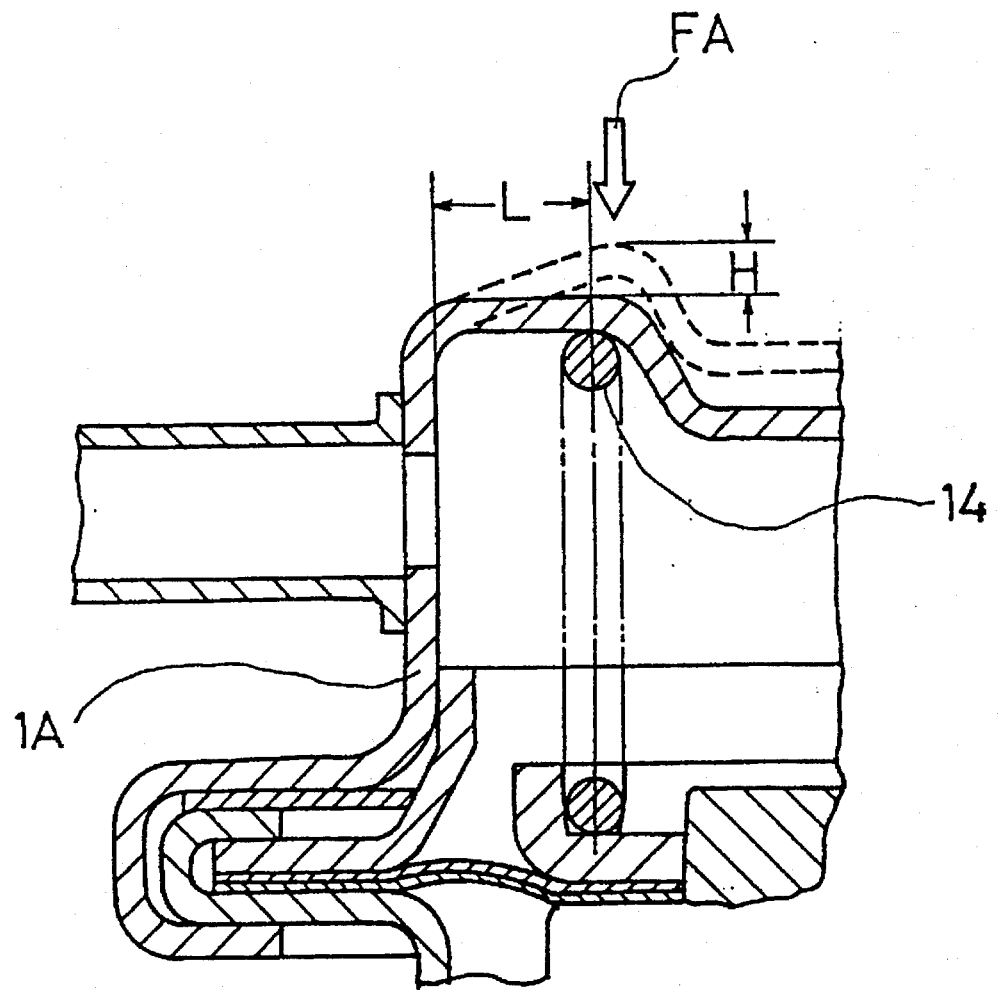
FIG. 10 is a cross-sectional view showing the adjustment of setting load supposing that the prior art pressure control valve is made small-sized.

Second Modification (FIG. 8)

A control spring 342 comprises a lower cylindrical spring and an upper conical spring which is integrally connected with the lower cylindrical spring. Since the diameter of the control spring 342 is small at the upper end thereof, the upper casing can be easily plastically deformed in case of adjusting the setting load.

The claw member 31 and engaging member 32 include such a structure that they are first respectively formed independently and thereafter they are fixed to each other. The engaging member 32 includes such a structure that the entire arrangement thereof is ring-shaped.

The present invention is not limited to the preferred embodiment and modifications thereof as mentioned above and illustrated in the attached drawings but includes all the structures without departing from the scope of the invention.

With the arrangement and function of the present invention, there are following effects.

The pressure control valve can be made small-sized and light-weighted.

With the structure of the control spring, since plastically deformable amount of the upper casing becomes compression amount of the spring, it is possible to adjust the setting load in the same manner as the prior art method even if the diameter of the upper casing is small.

Since the control spring is double-structured, namely, pitches of the upper spring are zero so as to make the control spring substantially rigid, the setting load can be determined by the lower cylindrical spring, thereby easily adjusting the setting load.

Since the upper and lower control springs are integrated with each other, the number of the parts can be reduced and the pressure control valve can be manufactured with low cost.

With the arrangement of the claw members, since the claws per se have elasticity, which dispenses with the prior art presser spring, the number of parts can be reduced and the assembly of the parts can be simplified. Further, the pressure control valve can be made light-weighted and manufactures with low cost due to the reduction of the number of parts.

With the arrangement of the engaging members, the valve body and holding member are not swung to the left and right so that the assembly of the valve body and the holding member can be easily performed and abrasion based on the swing of the valve body is reduced.

With the arrangement of the holding members and claw member, the number of parts is reduced and the assembly of the parts can be simplified, which makes the pressure control valve light-weighted.

Further, with the arrangement of the thickness of the caulked portion of the upper casing, the caulked portion is prevented from being open even if the caulking area is reduced when the pressure control valve is made small-sized, thereby preventing the diaphragm from being slipped off.

Still further, the overlap-structured diaphragm of the present invention can perform the caulking more easily compared with the double-structured baked diaphragm since there does not generate curling in the diaphragm.

What is claimed is:

1. A pressure control valve, comprising:

a valve shell comprising an upper casing and a lower casing, said upper casing being formed with a deformable top piece having a diameter;

a fuel inlet passage and a fuel outlet passage formed in said valve shell lower casing and an intake negative pressure introduction passage formed in said valve shell upper casing;

a diaphragm clamped and held between said upper and lower casings;

a holding member provided on said diaphragm, said holding member being formed of an integrated member that extends through said diaphragm and including a seat portion for receiving a control spring above said diaphragm, a contact portion which a ball contacts, at least one claw member formed of a plastically deformable member for rotatably holding said ball to said holding member, and at least one engaging member which is spaced from a side wall of said lower casing;

a valve body fixed to said ball which is held by said holding member;

a valve seat which is provided at an end of said fuel outlet passage and is closable by said valve body; and said control spring which is provided inside said upper casing so as to extend between said top piece of said upper casing and said holding member for pressing said holding member so as to close said valve seat by said valve body, said control spring comprising a two-stage spring composed of a lower control spring section disposed against said holding member and having a first diameter and an upper control spring section disposed against said valve shell upper casing top piece and having a second diameter less than said first diameter, said second diameter being less than said diameter of said upper casing top piece.

2. A pressure control valve, comprising:

a valve shell comprising an upper casing and a lower casing, said upper casing being formed with a deformable top piece having a diameter;

a fuel inlet passage and a fuel outlet passage formed in said valve shell lower casing and an intake negative pressure introduction passage formed in said valve shell upper casing;

a diaphragm clamped and held between said upper and lower casings, said diaphragm comprising a first diaphragm film body made of rubber and a second diaphragm film body made of oil resistant synthetic resin, said first and second diaphragm film bodies being independent of and overlapping with each other;

a holding member provided on said diaphragm;

a valve body fixed to a ball which is held by said holding member;

a valve seat which is provided at an end of said fuel outlet passage and is closable by said valve body; and a control spring which is provided inside said upper casing so as to extend between said top piece of said upper casing and said holding member for pressing said holding member so as to close said valve seat by said valve body, said control spring comprising a two-stage spring composed of a lower control spring section disposed against said holding member and having a first diameter and an upper control spring section disposed against said valve shell upper casing top piece and having a second diameter less than said first diameter, said second diameter being less than said diameter of said upper casing top piece.

3. A pressure control valve, comprising:

a valve shell comprising an upper casing and a lower casing, said upper casing being formed with a deformable top piece having a diameter;

a fuel inlet passage and a fuel outlet passage formed in said valve shell lower casing and an intake negative pressure introduction passage formed in said valve shell upper casing;

a diaphragm clamped and held between said upper and lower casings;

a holding member provided on said diaphragm;

a valve body fixed to a ball which is held by said holding member;

a valve seat which is provided at an end of said fuel outlet passage and is closable by said valve body; and a control spring which is provided inside said upper casing so as to extend between said top piece of said upper casing and said holding member for pressing said holding member so as to close said valve seat by said valve body, said control spring comprising a two-stage spring composed of a lower control spring section disposed against said holding member and having a first diameter and an upper control spring section disposed against said valve shell upper casing top piece and having a second diameter less than said first diameter, said second diameter being less than said diameter of said upper casing top piece;

said valve shell upper casing, said diaphragm and said valve shell lower casing being caulked to one another and a caulked portion of said upper casing having a thickness greater than the thickness of the other part of said upper casing.

4. A pressure control valve comprising:

a valve shell including an upper casing and a lower casing, said lower casing defining a circumferentially extending side wall;

a fuel inlet passage formed in said valve shell lower casing, a fuel outlet passage formed in said valve shell lower casing and a negative pressure intake passage formed in said valve shell upper casing;

a diaphragm secured between said valve shell upper and lower casings;

a valve seat provided on the end of said fuel outlet passage in said lower casing;

a valve assembly including a valve body adapted to be selectively positioned over said valve seat and a securement ball attached to said valve body;

a holding member attached to said diaphragm, said holding member including a receiving element for holding said valve assembly securement ball and at least one engagement member that extends away from said securement ball to a position adjacent said lower casing side wall so as to limit movement of said holding member toward said lower casing side wall; and a control spring disposed in said upper casing and connected to said diaphragm so as to exert a biasing force on said holding member so that said valve body is normally seated on said valve seat.

5. The pressure control valve according to claim 4, wherein said control spring is a two-stage spring having a lower section located adjacent said holding member having a first diameter and an upper section distal from said holding member wherein said upper section has a second diameter less than said first diameter.

6. The pressure control valve according to claim 5, wherein said holding assembly includes at least one claw member formed from elastically deformable material wherein said at least one claw member rotatably holds said securement ball to said holding member.

7. The pressure control valve according to claim 4, wherein said holding member extends through an opening in said diaphragm.

8. The pressure control valve according to claim 4, wherein said upper casing includes a deformable top piece holding said control spring in said upper casing, said top piece being deformable in response to an external force.

9. A pressure control valve comprising:

a valve shell including an upper casing and a lower casing, said lower casing defining a circumferentially extending side wall;

a fuel inlet passage formed in said valve shell lower casing, a fuel outlet passage formed in said valve shell lower casing and a negative pressure intake passage formed in said valve shell upper casing;

a diaphragm secured between said valve shell upper and lower casings;

a valve seat provided on the end of said fuel outlet passage in said lower casing;

a valve assembly including a valve body adapted to be selectively positioned over said valve seat and a securement ball attached to said valve body;

a holding member attached to said diaphragm so as extend through said diaphragm, said holding member including: a seating section disposed in said valve shell upper casing; a contact surface located in said valve shell lower casing; at least one claw member formed of deformable material located adjacent said contact surface, said at least one claw member being positioned to rotatably hold said securement ball against said contact surface; and at least one engagement member that extends away from said contact surface towards said lower casing side wall so as to limit movement of said holding member toward said lower casing side wall; and a control spring disposed in said upper casing and fitted at one end over said holding member seating section so as to exert a biasing force on said holding member so that said valve body is normally seated on said valve seat.

10. The pressure control valve according to claim 7, wherein said control spring is a two-stage spring having a lower section located adjacent said holding member having a first diameter and an upper section adjacent said valve shell upper casing wherein said upper section has a second diameter less than said first diameter.

11. The pressure control valve according to claim 9, wherein said at least one claw member and said at least one engaging member are formed from a single piece of material separate from said holding member.

12. The pressure control valve of claim 11, wherein a plurality of said claw members and a plurality of said engaging members are formed on said single piece of material.

13. The pressure control valve according to claim 9, wherein said upper casing includes a deformable top piece holding said control spring in said upper casing, said top piece being deformable in response to an external force.

14. A pressure control valve comprising:
- a valve shell including an upper casing and a lower casing, said lower casing defining a circumferentially extending side wall;
- a fuel inlet passage formed in said valve shell lower casing, a fuel outlet passage formed in said valve shell lower casing and a negative pressure intake passage formed in said valve shell upper casing;
- a diaphragm secured between said valve shell upper and lower casings, said diaphragm having a first diaphragm element formed of rubber and a second diaphragm element formed of synthetic resin, said diaphragm elements overlapping each other and being independent of each other;
- a valve seat provided on the end of said fuel outlet passage in said lower casing;
- a valve assembly including a valve body adapted to be selectively positioned over said valve seat and a securement ball attached to said valve body;
- a holding member attached to said diaphragm, said holding member including a receiving element for holding said valve assembly securement ball; and
- a control spring disposed in said valve shell upper casing and connected to said diaphragm so as to exert a biasing force on said holding member so that said valve body is normally seated on said valve seat, said control spring having a lower section having a first diameter that is positioned to extend over said holding member and an upper section positioned to abut said upper casing, said upper section having a diameter less than said first diameter.

15. The pressure control valve of claim 14, wherein said control spring is a conical-shaped spring.

16. The pressure control valve according to claim 14, wherein said upper casing includes a deformable top piece holding said control spring in said upper casing, said top piece being deformable in response to an external force.

17. A pressure control valve comprising:
- a valve shell including an upper casing and a lower casing, said lower casing defining a circumferentially extending side wall;
- a fuel inlet passage formed in said valve shell lower casing, a fuel outlet passage formed in said valve shell lower casing and a negative pressure intake passage formed in said valve shell upper casing;
- a diaphragm secured between said valve shell upper and lower casings;
- a valve seat provided on the end of said fuel outlet passage in said lower casing;
- a valve assembly including a valve body adapted to be selectively positioned over said valve seat and a securement ball attached to said valve body;
- a holding member attached to said diaphragm, said holding member including a receiving element for holding said valve assembly securement ball and at least one engagement member that extends away from said securement ball towards said lower casing side wall so as to limit movement of said holding member toward said lower casing side wall; and
- a control spring disposed in said valve shell upper casing and connected to said diaphragm so as to exert a biasing force on said holding member so that said valve body is normally seated on said valve seat, said control spring having a lower section having a first diameter that is positioned to extend over said holding member and an upper section positioned to abut said upper casing, said upper section having a diameter less than said first diameter, wherein
- said valve shell lower casing, said diaphragm and said valve shell upper casing are caulked to each other, and said upper casing is formed to have a first thickness along sections thereof caulked to said diaphragm and said lower casing, and a second thickness along sections thereof spaced from said caulked sections, and said first thickness is greater than said second thickness.

18. The pressure control valve of claim 17, wherein said diaphragm comprises a first diaphragm film body made of rubber and a second diaphragm film body made of oil resistant synthetic resin wherein said first and second diaphragm film bodies are independent of and overlap with each other.

19. The pressure control valve according to claim 17, wherein said upper casing includes a deformable top piece holding said control spring in said upper casing, said top piece being deformable in response to an external force.

* * * * *

UNITED STATES PATENT AND TRADEMARK OFFICE
CERTIFICATE OF CORRECTION

PATENT NO. : 5 606 991
DATED : March 4, 1997
INVENTOR(S) : Seiji Kuribayashi

It is certified that error appears in the above-indentified patent and that said Letters Patent is hereby corrected as shown below:

Column 10, line 56; change "claim 7" to ---claim 9---.

Signed and Sealed this

Tenth Day of June, 1997

BRUCE LEHMAN

Attest:

Attesting Officer    Commissioner of Patents and Trademarks